United States Patent [19]

Larson et al.

[11] Patent Number: 4,484,722
[45] Date of Patent: Nov. 27, 1984

[54] TRANSLATING RUDDER PEDAL SYSTEM

[75] Inventors: George W. Larson, Fort Worth; William E. Lee, Tarrant County; Edward N. Lewis, Jr., Fort Worth, all of Tex.

[73] Assignee: The United States of America as represented by the Secretary of the Air Force, Washington, D.C.

[21] Appl. No.: 393,834

[22] Filed: Jun. 30, 1982

[51] Int. Cl.³ ............................................. B64C 13/06
[52] U.S. Cl. ................................ 244/235; 244/122 R; 297/330
[58] Field of Search .................. 244/220, 221, 235, 87, 244/88, 121, 122 R, 122 A; 74/512, 478, 522; 297/70, 83, 216, 330, 429

[56] References Cited

U.S. PATENT DOCUMENTS

| 2,610,006 | 9/1952 | Boyce | 244/235 |
|---|---|---|---|
| 2,638,290 | 5/1953 | Lecarme | 244/86 |
| 3,016,264 | 1/1962 | Hughes | 297/69 |
| 3,129,605 | 4/1964 | Bonnell, Jr. et al. | 74/501 |
| 3,414,324 | 12/1968 | Taylor et al. | 297/90 |
| 3,588,170 | 6/1971 | Knabusch et al. | 297/69 |
| 3,719,391 | 3/1973 | Neri | 297/341 |
| 3,934,927 | 1/1976 | Zur | 297/69 |
| 4,004,763 | 1/1977 | Bunnell et al. | 244/122 R |
| 4,062,566 | 12/1977 | Hensler et al. | 297/216 |
| 4,285,545 | 8/1981 | Protze | 297/216 |
| 4,386,803 | 6/1983 | Gilderbloom | 297/330 |

Primary Examiner—Trygve M. Blix
Assistant Examiner—Rodney Corl
Attorney, Agent, or Firm—Donald J. Singer; Frank J. Lamattina

[57] ABSTRACT

A translating rudder pedal system which includes a rudder pedal assembly and a reclinable, translationally movable, seat operably connected to the pedal assembly, with both the pedal assembly and the seat mounted in a vehicle, such as an aircraft. The system ensures that, irrespective of the movement and positioning of the seat, the feet of the user seated in the seat always remain in contact with the control pedals of the rudder pedal assembly.

1 Claim, 4 Drawing Figures

TRANSLATING RUDDER PEDAL SYSTEM

STATEMENT OF GOVERNMENT INTEREST

The invention described herein may be manufactured and used by or for the Government for governmental purposes without the payment of any royalty thereon.

BACKGROUND OF THE INVENTION

The instant invention relates to a control system for a vehicle, such as an aircraft, in which control means, such as rudder control pedals, move relative to, and in response to the movement of, a reference component of the vehicle, such as a reclinable, translationally movable, pilot's seat.

In some aircraft, a unique method is used for repositioning the pilot in his seat. The method forces the pilot to move his feet forwardly as he is repositioned in his seat from the upright to a reclined position; and, it forces the pilot to move his feet rearwardly as he is repositioned in his seat from a reclined position to the upright position.

It is here to be noted that the aforementioned repositioning of the pilot in his seat is necessary during high "g" maneuvers encountered in high performance fighter-type aircraft.

It is also to be noted that a pilot must be able to reach and to operate the rudder control pedals of the aircraft easily, at all times, and under any conditions, e.g., while in the upright position in his seat, while in a reclined position therein, and during transit from and to any of these positions and those intermediate thereto.

As a result of all of the foregoing, a genuine pressing need has arisen for a means to ensure that the position (i.e., the location) of the rudder control pedals correspond with the position (i.e., the location) of the pilot's feet at all times.

SUMMARY OF THE INVENTION

The instant invention fulfills the above-mentioned need, and thereby constitutes a significant advance in the state-of-the-art, by providing a structural system which translates the pedals in a forward direction when the pilot's seat reclines and the pilot extends his legs, and which translates the pedals in a rearward direction when the pilot's seat moves upright from a reclined position and the pilot retracts his legs.

Accordingly, it is an object of the instant invention to provide structural means by which the position of the rudder control pedals correspond with the position of the pilot's feet at all times.

It is another object of this invention to provide structural means by which a pilot can make one adjustment of the rudder control pedals at the beginning of the flight, and this one adjustment need not be altered during flight, regardless of the pilot's body position in the pilot's seat thereafter.

It is a further object of the instant invention to provide a structural means which can be used not only in an aircraft, but also in any vehicle in which control means are operatively connected to a vehicle control structure, with the control means being adjustably mounted so as to be movable relative to (and in response to) a reference, such as a seat occupied by the user of the control means.

These objects of the instant invention, as well as other object related thereto (e.g., simplicity of the structure, ease of use, economy of manufacture, and reliability in use), will become readily apparent after a consideration of the description of the instant invention, together with reference to the contents of the figures of the drawing.

DESCRIPTION OF THE PREFERRED EMBODIMENT

Figure 1:
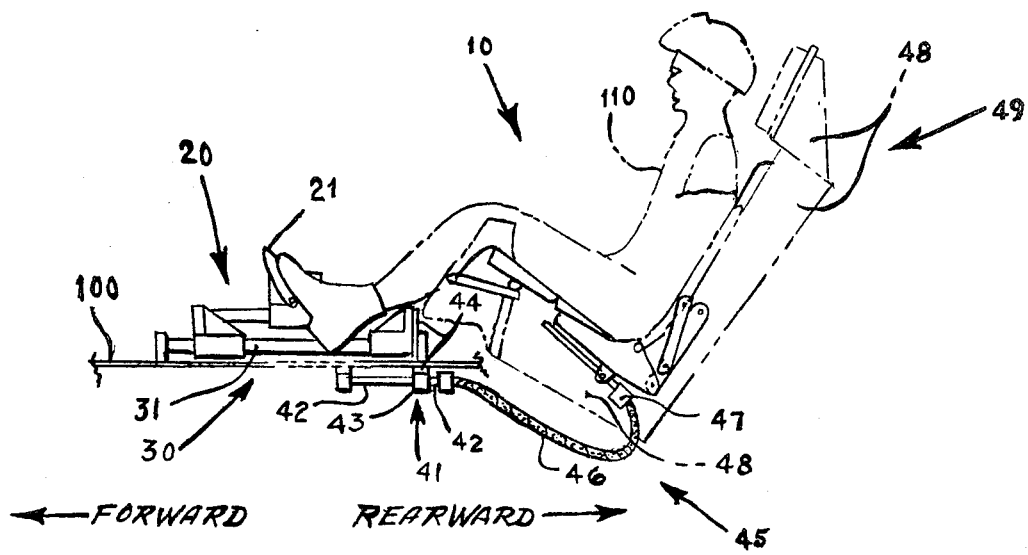
FIG. 1 is a side elevation view, in simplified pictorial and schematic form, of the instant invention in its working environment in a vehicle while the vehicle seat and the user thereof are in the upright position.

With reference to FIGS. 1-4, the preferred embodiment 10 of the instant invention translating rudder pedal control system comprises, in the most basic and generic structural form: a rudder pedal assembly 20, which includes a pair of rudder control pedals 21 and 22; means (generally designated 30) operatively associated with the rudder pedal assembly 20, for permitting forward (i.e., fore) and rearward (i.e., aft) translational movement of the pedal assembly 20; and means (generally designated 40), operatively connected to the rudder pedal assembly 20, for imparting forward and rearward translational motion to the pedal assembly 20.

The translational movement permitting means 30 includes a plurality of rails, preferably two, such as 31 and 32, on which the pedal assembly 20 can be driven forwardly (i.e., fore) or rearwardly (i.e., aft) by the translational motion imparting means 40.

This means 40 includes means (generally designated 41), operably connected to the rudder pedal assembly 20, for converting any imparted rotary motion to linear motion. This means 41 preferably includes: a rotable jackscrew member, such as 42, to which motion is imparted and which rotates in response to the imparted motion; and, a nut member, such as 43, which is threadedly connected to the jackscrew member 42 and through which the jackscrew member 42 rotates.

The translational motion imparting means 40 also includes a movable bracket member 44 which is attached to, and interconnects, the nut member 43 and the pedal assembly 20.

The translational motion imparting means 40 further includes: a translational motion imparting source which will be described and discussed later herein and which is operatively connected to the aforedescribed means for converting imparted rotary motion to linear motion 41; and, an actuation means (generally designated 45) which operably interconnects the means for converting imparted rotary motion to linear motion 41 and the translational motion imparting source. This actuation means 45 includes a flexible shaft member 46 operably connected at one end 46A to the rotatable jackscrew member 42 and operably connected at the other end 46B to the actuator member 47, and with the actuator member 47 attached to the translational motion imparting source (hereinafter to be described and discussed).

The hereinbefore mentioned translational motion imparting source (generally designated 48, FIG. 1 and 2) includes a reclinable, translationally movable, chair or seat 49. This chair 49 is structured such that when it is reclined, it simultaneously moves forwardly translationally; and, when it is being returned from the reclined position to the upright position, it simultaneously moves rearwardly translationally.

Figure 2:
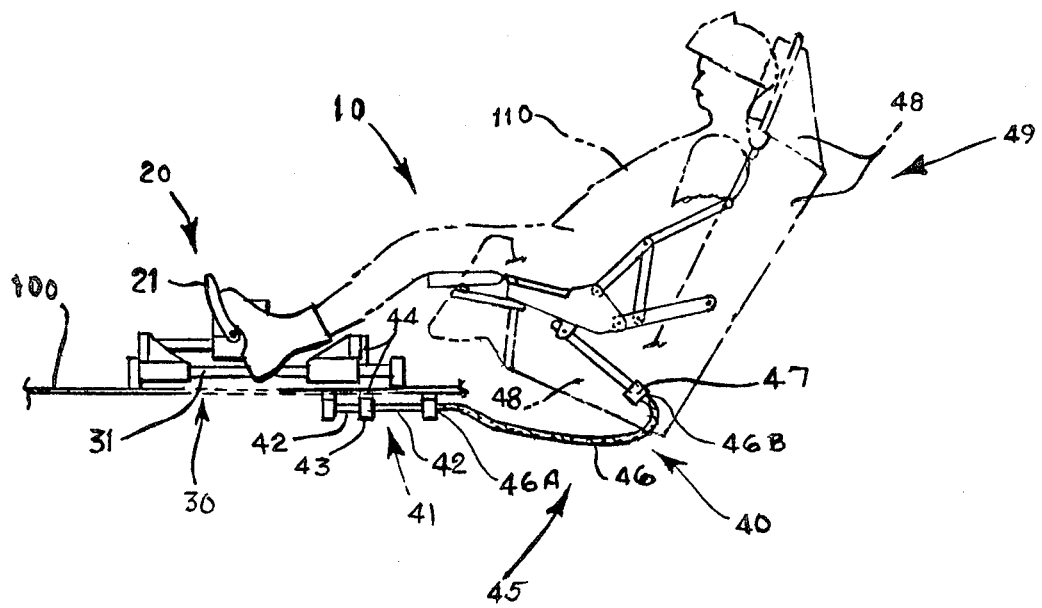
FIG. 2 is a side elevation view, in simplified pictorial and schematic form, of the instant invention in its working environment in a vehicle while the vehicle seat and the user thereof are in the reclined position.
Figure 3:
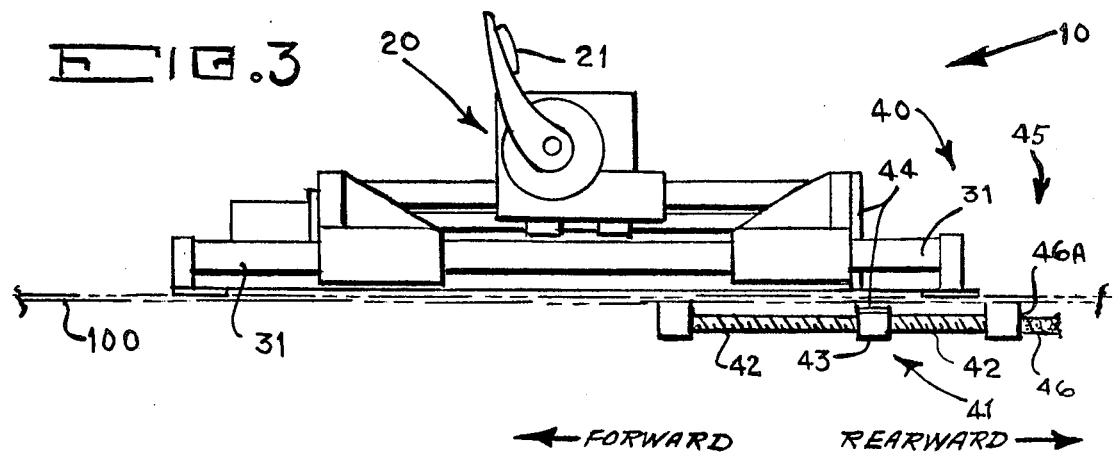
FIG. 3 is a side elevation view, in simplified pictorial and schematic form, of the preferred embodiment of the instant invention.
Figure 4:
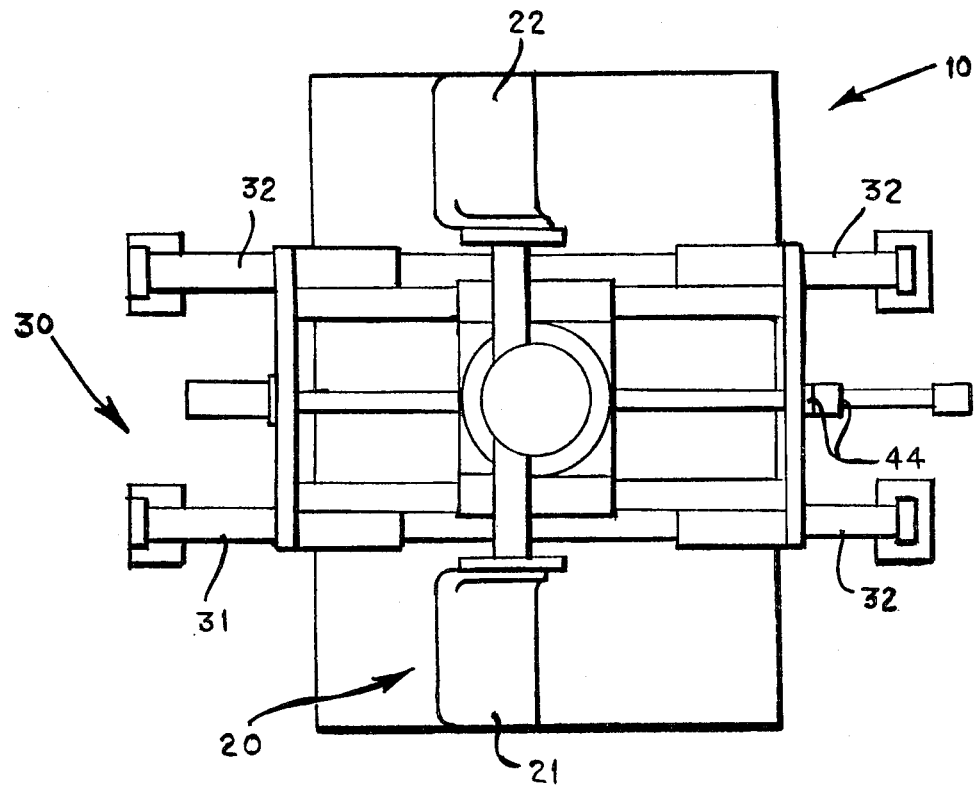
FIG. 4 is a top plan view, in simplified pictorial and schematic form, of the preferred embodiment of the instant invention.

The instant inventive translating rudder pedal system 10, FIGS. 1-4, is ideally suited for use while mounted in, and operable associated with, a vehicle, such as 100, FIGS. 1 and 2. In this regard, the preferred vehicle is an aircraft 100. In that case, the chair 49 is a pilot's seat, and the user 110, FIGS. 1 and 2, of the chair 49, the rudder pedal assembly 20, and the vehicle 100 is a pilot.

MANNER OF OPERATION OF THE PREFFERED EMBODIMENT

The manner of operation, and of use, of the preferred embodiment 10, FIGS. 1-4, of the instant invention can be easily ascertained by any person of ordinary skill in the art from the foregoing description, coupled with reference to the contents of the Figures of the drawing.

For others, the following explanation is given. As the jackscrew member 42 is rotated by flexible shaft member 46 which is moved by the actuator member 47 that is operably attached to the seat 49, the nut member 43 converts this rotary motion of the jackscrew member 42 into linear motion, forwardly or rearwardly, depending upon the direction of rotation of the jackscrew member 42. The linear motion of the nut member 43 is transmitted to the rudder pedal assembly 20 through movable bracket member 44, which is attached to both the nut member 43 and the rudder pedal assembly 20. The rudder pedal assembly 20 will then be driven forwardly or rearwardly along the rails 31 and 32 which are mounted to the floor of the vehicle 100. Thus, the direction of travel of the rudder pedal assembly 20 depends entirely upon the direction of the rotation of the jackscrew member 42, which in turn depends upon the direction of rotation of the actuator member 47 which is operably attached to the reclinable, translationally movable, seat or chair 49 in which the user 110 is seated.

In a nutshell, when the seat 49 moves forwardly and the backrest reclines, the legs and the feet of the user 110 move forwardly; and, because of the structural positioning and relationships of the constituent components of the system 10, the rudder pedal assembly 20 is driven forwardly, and the result is that the feet of the user 110 and the pedals 21 and 22 of the pedal assembly 20 remain in contact. Likewise, when the seat 49 moves rearwardly and the backrest moves from the reclining position to the upright position, the legs and feet of the user 110 move rearwardly, and the feet of the user 110 and the pedals 21 and 22 of the pedal assembly 20 remain in contact. Stated another way, regardless of the user's position in the seat 49 caused by the movement of the seat (and, of course, the bracket member 44), the user's feet will always be in contact with the pedals 21 and 22 of the pedal assembly 20.

CONCLUSION

It is abundantly clear from all of the foregoing, and from the contents of the Figures of the drawing, that the stated objects of the instant invention 10, as well as other objects related thereto, have been achieved.

It is noted that, although there have been described and shown the fundamemtal and unique features of the instant invention, as applied to a preferred embodiment 10, nevertheless various other embodiments, variations, adaptations, substitutions, additions, and the like may occur to and can be made by those of ordinary skill in the art. For example, the translation rudder pedal system 10 can be adapted for use as a simulator, without the use of a vehicle 100, or, the vehicle 100 can be a boat, rather than an aircraft, and the translation rudder pedal system 10 can be adapted for use therewith.

What is claimed is:

1. A translating rudder pedal system mounted in, and operably associated with, an aircraft, comprising:
    a. a rudder pedal assembly which includes a pair of rudder control pedals for use by a pilot of said aircraft;
    b. means, operably associated with said rudder pedal assembly, for permitting forward and rearward translational movement of said assembly, wherein this means includes a plurality of rails; and
    c. means, operably connected to said rudder pedal assembly, for imparting forward and rearward translational motion to said assembly, whereby said assembly is driven forwardly and rearwardly on said plurality of rails by this means, and wherein this means includes:
        (1) means, operably connected to said rudder pedal assembly, for converting imparted rotary motion to linear motion, wherein this means includes:
            a rotatable jackscrew member to which motion is imparted and which rotates in response to said imparted motion;
            a nut member threadedly connected to said jackscrew member, and through which rotates said jackscrew member;
            whereby the rotary motion of said jackscrew member is converted by said nut member into linear motion, resulting in linear movement of said nut member, forwardly and rearwardly, in response to the direction of rotational motion of said jackscrew member;
        (2) a translational motion imparting source which is operably connected to said means for converting imparted rotary motion to linear motion, and which includes a reclinable, translationally movable, pilot's seat;
        (3) actuation means operably interconnecting said means for converting imparted rotary motion to linear motion and said translational motion imparting source, wherein said actuation means includes a flexible shaft member and an actuator member, with said shaft member operably connected at one end to said rotatable jackscrew member and operably connected at another end to said actuator member, and with said actuator member attached to said translational motion imparting source; and
        (4) a movable bracket member attached to, and interconnecting, said nut member and said rudder pedal assembly, whereby motion imparted to said nut member by said rotating jackscrew member is transmitted by said linearly moving nut member to said movable bracket member, thereby causing said bracket member, and said rudder pedal assembly attached thereto, to move linearly in the same direction as said moving nut member;

whereby when translational motion is imparted to said rudder pedal assembly, said assembly translationally moves in response thereto; and whereby when said pilot of said aircraft is seated in said seat, said pilot is able to maintain constant feet contact with said pair of rudder control pedals when said seat is still or is translationally moved forwardly or rearwardly, and when said seat is upright, is reclined, or is in transit from, or to, an upright or a reclined position.

* * * * *